United States Patent [19]

Bjurström

[11] 4,409,531

[45] Oct. 11, 1983

[54] METHOD AND A DEVICE FOR INCREASING THE LINEARITY OF A SERVO SYSTEM

[75] Inventor: Lennart Bjurström, Karlskoga, Sweden

[73] Assignee: Aktiebolaget Bofors, Bofors, Sweden

[21] Appl. No.: 192,659

[22] Filed: Oct. 1, 1980

[30] Foreign Application Priority Data

Oct. 2, 1979 [SE] Sweden ............................. 7908149

[51] Int. Cl.$^3$ ........................ F41G 5/06; G05B 13/00
[52] U.S. Cl. .................................. 318/631; 89/41 LE
[58] Field of Search .............. 89/41 M, 41 LE, 41 H; 318/609, 619, 621, 622, 631

[56] References Cited

U.S. PATENT DOCUMENTS

| | | | |
|---|---|---|---|
| 1,959,805 | 5/1934 | Wittkuhns et al. .................. | 318/631 |
| 2,470,099 | 5/1949 | Hall ..................................... | 318/621 |
| 2,569,818 | 10/1951 | Lee ..................................... | 318/631 |
| 2,581,149 | 1/1952 | Shaw ................................... | 318/631 |
| 2,688,112 | 8/1954 | Wimberly ........................... | 318/631 |
| 3,430,536 | 3/1969 | Oelrich ............................... | 91/47 |

OTHER PUBLICATIONS

198 USPQ210, In re Oelrich and Divigard, Jun. 15, 1978.

*Primary Examiner*—Stephen C. Bentley
*Attorney, Agent, or Firm*—Pollock, Vande Sande & Priddy

[57] ABSTRACT

The invention relates to a method and a device for increasing the linearity of a servo system, for instance a gun servo. The servo system comprises an oscillator (6) having a fixed frequency for superimposing a so-called dither signal on the control signal of the servo system. The frequency of the dither signal is so chosen below, about or just above the upper frequency limit of the servo system. The linear effect produced by the dither signal results in a higher gain attained in the system even for very small signals.

4 Claims, 1 Drawing Figure

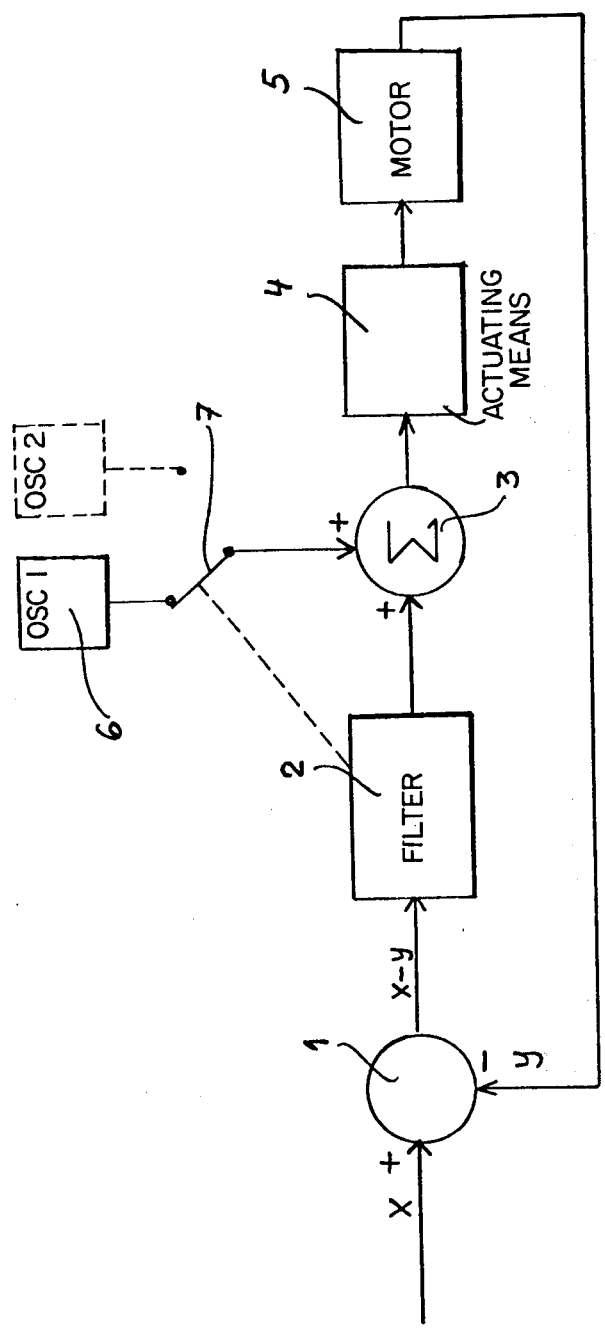

METHOD AND A DEVICE FOR INCREASING THE LINEARITY OF A SERVO SYSTEM

The present invention relates to a method and a device for increasing the linearity of a servo system such as a gun servo.

In certain servo systems a very accurate tracking accuracy is required which, however, is difficult to achieve by present methods. This is the case especially for servo systems including guns, sights etc. for aiming at and following (tracking) a moving target. Other examples of similar servo systems could be found in the field of radar.

In order to increase the tracking accuracy of such a servo system it is usually desirable to have the gain in the system as high as possible. The requirement that the system must be stable, however, limits the gain. For low frequencies it is possible to considerably increase the gain without affecting the stability. One example of such a system is described in our co-pending patent application Ser. No. 192,658 in which the signal processing means comprises a specific accuracy-increasing filter network.

One problem which can not be solved by introducing such a filter network is the decrease in gain which arises for very small signals in the servo system caused by slight imperfections such as nonlinearities, back-lash, frictions, hysteresis phenomenas etc., inherent in the components making up the servo system, for instance in the valves and in the motors.

SUMMARY OF THE INVENTION

The object of the present invention is to provide an efficient linearity and then also a higher gain in a servo system even for small signals. According to the invention a so-called dither signal is introduced in the system. To use dither signals per se is previously known, but such signals have not previously been used for this object and they have not produced the desired linear characteristics of the single components nor of the entire system. The prior purpose of introducing a dither signal has been to eliminate the influence of hysteresis phenomenas and frictions in single components, for instance the magnetic needle of a control valve. In this case the frequency of this dither signal has been chosen only with respect to this particular component which means no efficient linear effect of this component together with the other components in the system results. This depends on the fact that the frequencies used for the dither signals previously have been too high, i.e. much higher than the upper frequency limit of the control system. A linear effect has not been produced in this case as a dither signal of such high frequency is rapidly attenuated in the system.

Furthermore, for practical reasons, it has not previously been possible to apply the dither signals to certain kinds of components. The present invention, however, makes it possible to provide such components with a dither signal.

According to the present invention a dither signal is superimposed on the control signal of the servo system, the frequency of said signal arranged to be below, about or just above the upper frequency limit of the servo systsm. This means that the frequency is significally lower than the frequency of previously used dither signals. As an example for a gun servo this frequency is about 8 Hz.

DESCRIPTION OF THE FIGURES

The FIGURE demonstrates the use of the invention in a servo system.

DESCRIPTION OF THE PREFERRED EMBODIMENT

In the following the invention will be described more in detail in connection with the drawing in which a servo system in which the invention could be used is schematically illustrated. As already mentioned the invention is of specific interest in such servo systems in which a very high accuracy is required. The aiming system of a gun, radar systems, sights etc., are examples of such servo systems and in the following the invention will be described in connection with such a system. It will be understood, however, that the invention is not limited to such a system, but can be varied within the scope of the following claims.

The servo system illustrated in the drawing may for instance represent the train control system or elevation control system for a gun and comprises comparison means, such as synchros, in which an input signal x, the command angle in train or elevation, is compared with the actual angle y in train or elevation. The comparison means 1 initiates an error signal x-y, which corresponds to the difference between the commanded angle and the actual angle, the angular error. By means of signal processing means 2 the error signal is processed into an appropriate form and is fed via summing means 3 to actuating means 4 and a motor 5 for driving the gun etc. until the angular error becomes zero.

The gun control normally comprises two phases, the target acquisition phase and the target tracking phase. During the target tracking phase a very accurate tracking of the target with small angular errors is desired. It is desirable to have the gain of the system as high as possible. In order to prevent a reduction of the gain in connection with small signals in the system due to slight imperfections such as nonlinearities, backlash, frictions, hysteresis phenomenas etc. which are always present in the components which make up the system, a so-called dither signal is superimposed on the control signal emitted by the signal processing means 2. Such a dither signal has a considerable linear effect if the dither frequency is below, about or just above the upper frequency limit of the servo system. As illustrated in the drawing the dither signal is generated in a dither oscillator 6 which in this case is permanently set on a frequency of 8 Hz. A dither signal having this frequency and a moderate amplitude has proved to penetrate and linearize the entire system even for very low signals in the system. As an alternative the dither signal can be added to the input signal x before the comparison means 1, but the arrangement which has been described above is ordinarily preferred.

Even if the linear effect which can be achieved by means of the dither signal is very important for all servo systems in which an accurate tracking is required, it is, however, especially advantageous in such servo systems in which the signal processing means comprises special accuracy-increasing filter networks, for instance of the type described in our co-pending patent application Ser. No. 192,658. Such a filter increases the system gain and the tracking accuracy increases, but at the same time a so-called conditional stability arises in the system at a specific frequency. At this frequency the gain margin must be so high that the nonlinearity in the system does not produce selfoscillations of discernible amplitude. By introducing an accuracy-increasing filter it is then even more important that the components which make up the aiming system are linear. By introducing a dither signal with its significant linear effect it is then possible to use said filter in spite of the conditional stability which will arise and even if the linearity of the components in the system is not good.

Filter networks of the above-mentioned kind are usually intended to be connected to the system only during a specific phase of the operation, i.e. when a very accurate control operation is necessary, for instance during the target tracking phase in an aiming system of a gun. In this case it can be useful to connect the dither oscillator together with said accuracy-increasing filter. In the drawing we have indicated switching means 7 which can be controlled in such a way that the dither oscillator 6 is connected to the system only when the accuracy-increasing filter also is connected to the system.

In the drawing only one dither oscillator 6 is illustrated and which oscillator is fixed on a frequency of 8 Hz. The system may, however, be provided with one or more further dither oscillators set on other frequencies intended for instance to eliminate the influence of hysteresis and frictions in individual components of the system and which are known per se and therefore not illustrated in the drawing. In case that more dither oscillators are used it may be appropriate to control the connection also of these additional dither oscillators by means of the switching means 7.

I claim:

1. In a closed loop servo system, wherein a command signal and position signal are compared forming an error signal serving as a control signal reducing said error signal, said system having a bandwidth with an upper frequency limit, an apparatus for increasing the accuracy and response linearity of said servo system comprising:
   one or more integrating second order filter networks for filtering said control signal;
   a dither frequency generator for producing a dither signal at a frequency substantially the same as said upper frequency limit; and
   switching means for inserting said second order filter networks in said servo system to filter said control signal and for applying said dither signal to said control signal during small position errors, whereby overall servo system response linearity is improved by said dither signal.

2. A device according to claim 1 wherein the means for generating the dither signal comprises a dither oscillator having a fixed frequency.

3. A device according to claim 2 wherein the frequency of the dither oscillator lies in the range of 5-20 Hz.

4. In a closed loop servo system wherein a command signal and position signal are compared forming a position error signal serving as a control signal, said closed loop servo system having a bandwidth with an upper frequency limit, a method for increasing the accuracy and response linearity of said servo system comprising:
   generating a dither signal having a frequency substantially the same as said upper frequency limit;
   inserting one or more integrating second order filter networks in said servo system during small position errors; and,
   combining said dither signal and control signal during said small position errors whereby the entire servo system response linearity is improved.

* * * * *